Patented July 15, 1924.

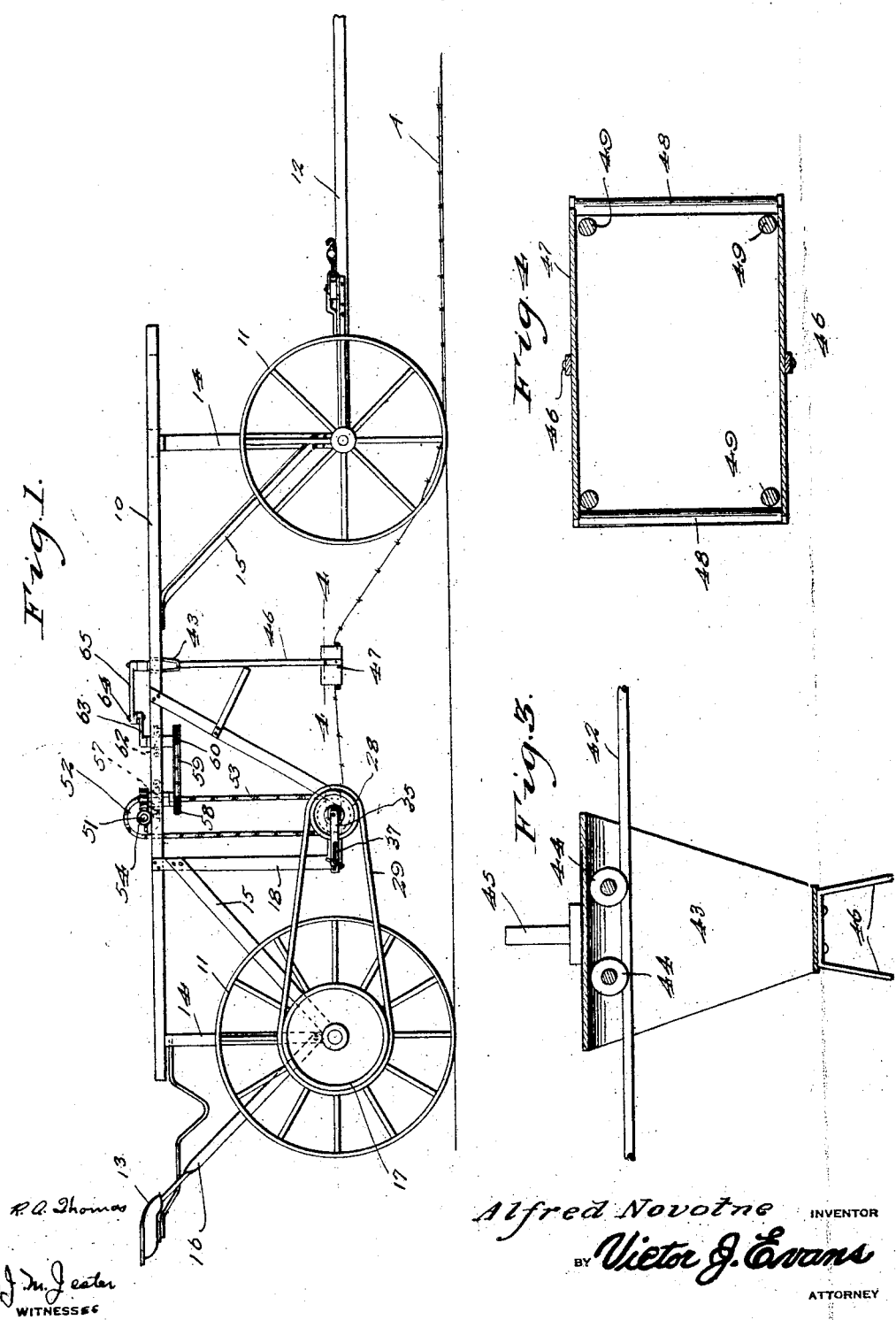

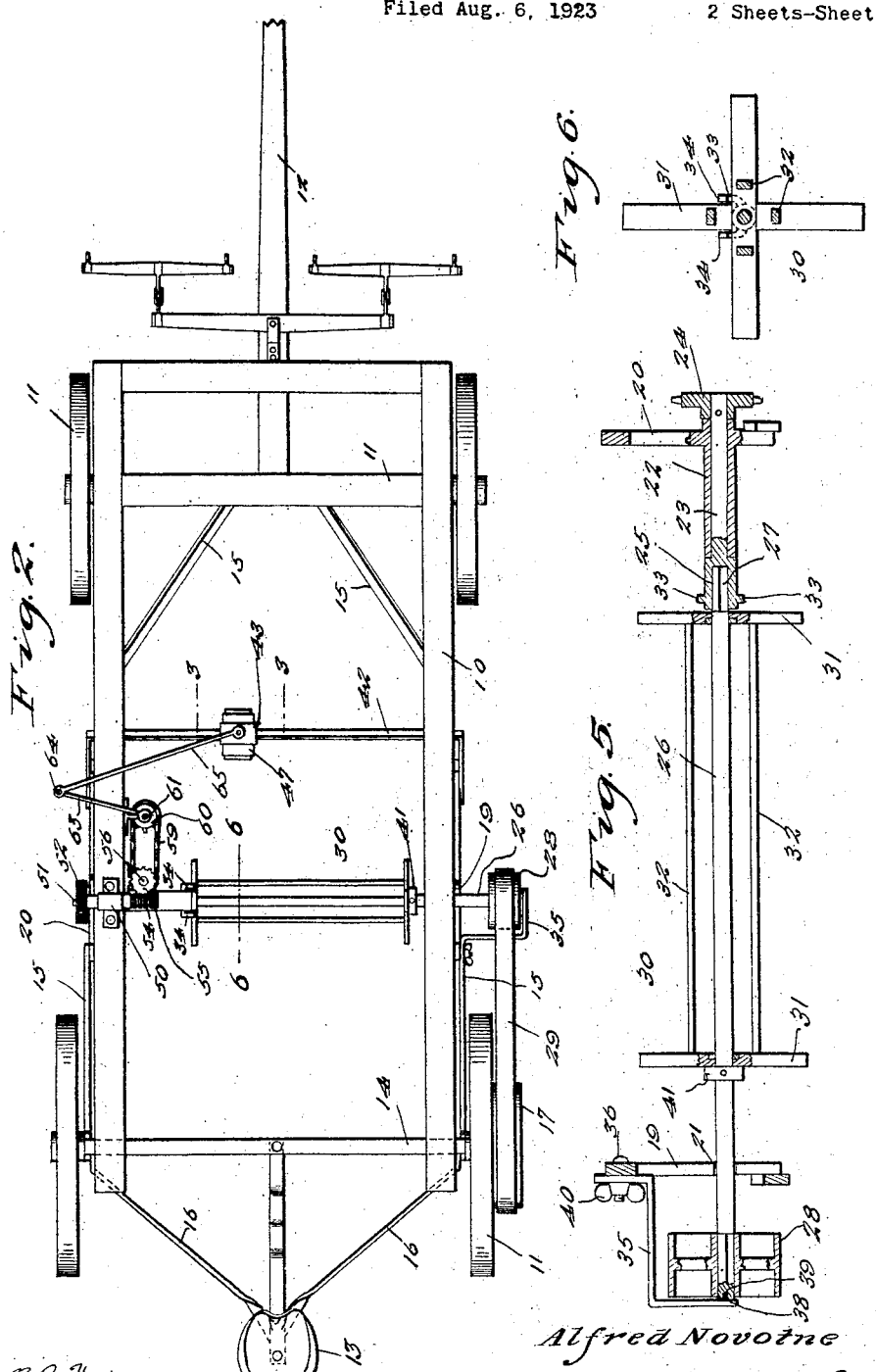

1,501,800

UNITED STATES PATENT OFFICE.

ALFRED NOVOTNE, OF GIBBON, NEBRASKA.

WIRE-WINDING MACHINE.

Application filed August 6, 1923. Serial No. 655,963.

*To all whom it may concern:*

Be it known that I, ALFRED NOVOTNE, a citizen of the United States, residing at Gibbon, in the county of Buffalo and State of Nebraska, have invented new and useful Improvements in Wire-Winding Machines, of which the following is a specification.

This invention relates to wire reeling and winding devices, and has for its object the provision of a novel machine designed to be drawn along the ground for reeling in wire taken down when removing a fence.

An important and more specific object is the provision of a device of this character in which all the moving parts are driven by one of the ground engaging wheels of the machine, means being provided not only for rotating the winding reel but also for guiding the wire thereonto so that it will be disposed evenly and in layer formation.

An additional object is the provision of a device of this character which will be simple and inexpensive in manufacture, easy to control and operate, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the complete device,

Figure 2 is a top plan view thereof,

Figure 3 is a detail section on the line 3—3 of Figure 2,

Figure 4 is a detail horizontal section on the line 4—4 of Figure 1,

Figure 5 is a detail longitudinal section through the power shaft and

Figure 6 is a cross section through the reel, the section being taken on the line 6—6 of Figure 2.

Referring more particularly to the drawings I have shown the machine as comprising an elongated frame 10 of any ordinary or preferred construction and mounted upon ground engaging wheels 11. At one end the frame is equipped with a draft tongue 12 and at its other end with a seat 13 for the driver. The wheels are shown as mounted on axles carried by members 14 depending from the frame and strengthened by braces 15. The seat is strengthened and supported by braces 16. Carried by one rear wheel is a pulley 17 for a purpose to be described.

Depending from the main frame, at opposite sides thereof, are bars 18 carrying or formed with forward extensions 19 and 20, the former of which is provided with a slot 21, and the latter of which carries an elongated bearing 22. Journaled through the bearing 22 is a shaft 23 having one end equipped with a sprocket 24 and having its other end formed with a socket 25 which is preferably square. The numeral 26 represents the main shaft which has one end reduced and squared as shown at 27 and fitting within the socket 25. The other end portion of this shaft is disposed within the slot 21 which serves as a bearing and the terminal portion has secured thereon a pulley 28 driven by means of a belt 29 trained thereabout and engaged over the pulley 17.

The shaft 26 carries the reel 30 and this reel is here shown as including end members formed of bars 31 secured in crossed relation and connected by longitudinal strips 32. To cause the reel to be rotated with the shaft 26 I provide arms 33 which are formed or secured upon the socket member 25 and which have extensions 34 engaging between the cross bars 31 at one end of the reel.

For holding the shaft 26 in driving engagement within the socket 25, I provide an angularly shaped bracket arm 35 mounted on the lower end of one depending bar 18 as for instance by means of a bolt 36 passing through the bar and through a slot 37 in the bracket arm. This arm extends outwardly beyond the pulley 28 and its free end carries a tit 38 engaging within a recess 39 in the end of the shaft 26. By this construction it will be seen that when the nut 40 on the bolt 36 is loosened the arm 35 may be moved to disengage the tit 38 from the recess 39 which will enable the operator to swing the arm 35 out of the way, after which the shaft 26 may be moved within the slot 21 to withdraw the squared end 27 from the socket 25, after which the shaft may be lifted in the slot 21 so that the reel may be removed and replaced by an empty one. The longitudinal movement of the shaft 26 above described brings the reel out of engagement with the arms 34 which hold it for rotation with the shaft 26. It might be mentioned that the shaft 26 carries a stop collar 41 against which abuts the end of the reel opposite that engaged by the arms 34.

Extending across the frame 10 is a guide rail 42 upon which is movable a carriage 43 equipped internally with grooved rollers 44 riding on the track. At its upper end this carriage is provided centrally with a trunnion 45. Secured to and depending from the carriage are rods 46 which straddle and are secured to opposite sides of a guide box 47 which is open at its front and back and through which is threaded the wire A to be reeled in. At the open front and back of this box are horizontal rollers 48 and vertical rollers 49 between which the wire travels. The provision of rollers is important as it prevents the wire from catching on the front edge of the box.

Mounted on one side of the frame is a bearing 50 in which is journaled a shaft 51 carrying a sprocket 52 about which is trained a chain 53 which is in turn trained about the sprocket 24. The shaft 51 carries a worm 54 meshing with a worm wheel 55 on a vertical shaft 56 journaled in a bracket 57 mounted on the frame. The shaft 56 also carries a sprocket 58 about which is trained a chain 59 which is also trained about a sprocket 60 on a shaft 61 journaled through a bracket 62. On the upper end of the shaft 61 is a pitman 63 with which is pivotally connected at 64 a link 65 which is rotatably engaged upon the trunnion 45.

In the operation, assuming that wire A has been removed from a fence and is lying upon the ground, in order to reel in the wire, one end thereof is threaded through the box 47 from front to back thereof and secured onto the reel 30. As the machine is drawn along the ground the pulley 17 drives the pulley 28 and shaft 26 so that the reel will be rotated and will wind the wire thereonto. At the same time the rotation of the shaft 26 is imparted to the shaft 23 and sprocket 24 and as a consequence the shaft 51 is driven and will drive, through the worm gearing and sprocket mechanism described, the shaft 61. As this shaft is thus turned the pitman 63 will move the link 65 and slide the carriage 43 along the track 42, the travel being substantially the same as the length of the reel. The box 47 carried by this carriage will of course be moved transversely therewith and will guide the wire onto the reel so that uniform layers will be produced. The mechanism for and operation of replacing a full reel with an empty one has been already described and it is consequently thought that a further explanation is unnecessary.

From the foregoing description and a study of the drawings it will be apparent that I have thus provided a simply constructed, inexpensive and easily operated machine which will efficiently perform the function of reeling in wire lying upon the ground. The device has the great advantage of making possible the reuse of wire which has been removed from a fence and which would under ordinary circumstances either become tangled or be discarded for some other reason.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A machine of the character described comprising a wheel supported frame provided with draft means, a shaft mounted within the frame and carrying a removably mounted reel, means for rotating said shaft, a guide movable laterally of the frame for guiding wire to the reel, and means for moving said guide synchronously with the reel, the guide including a supporting track, a carriage slidable thereon, and a box like guide eye depending from said carriage.

2. A machine of the character described comprising a wheel supported frame provided with draft means, a shaft mounted within the frame and carrying a removably mounted reel, means for rotating said shaft, a guide movable laterally of the frame for guiding wire to the reel, and means for moving said guide synchronously with the reel, the guide including a supporting track, a carriage slidable thereon, and a box like guide eye depending from said carriage, said box like guide proper having its front and back open and equipped with vertical and horizontal rollers.

3. In a device of the character described, a wheel supported frame, a slotted bearing member carried thereby, a rotatably mounted shaft formed at one end with an angular socket, a second shaft slidably and laterally movably mounted through said slotted bracket and having an angular end normally engaged within said socket, a reel detachably engaged upon said second named shaft, means for holding said reel for rotation with the second named shaft, and means operated by one ground engaging wheel for rotating said second named shaft.

4. In a device of the character described, a wheel supported frame, a slotted bearing member carried thereby, a rotatably mounted shaft formed at one end with an angular socket, a second shaft slidably and laterally movably mounted through said slotted bracket and having an angular end normally engaged within said socket, a reel detachably engaged upon said second named shaft, means for holding said reel for rotation with the second named shaft, means operated by one ground engaging wheel for rotating said second named shaft, and means for normally preventing longitudinal and lateral movement of the second named shaft.

5. In a device of the character described, a wheel supported frame, a slotted bearing member carried thereby, a rotatably mounted shaft formed at one end with an angular socket, a second shaft slidably and laterally movably mounted through said slotted bracket and having an angular end normally engaged within said socket, a reel detachably engaged upon said second named shaft, means for holding said reel for rotation with the second named shaft, means operated by one ground engaging wheel for rotating said second named shaft, and means for normally preventing longitudinal and lateral movement of the second named shaft, including an angular bracket arm movably mounted on the frame and carrying an element engaging within a recess in the end of the second named shaft.

In testimony whereof I affix my signature.

ALFRED NOVOTNE.